Patented Aug. 24, 1954

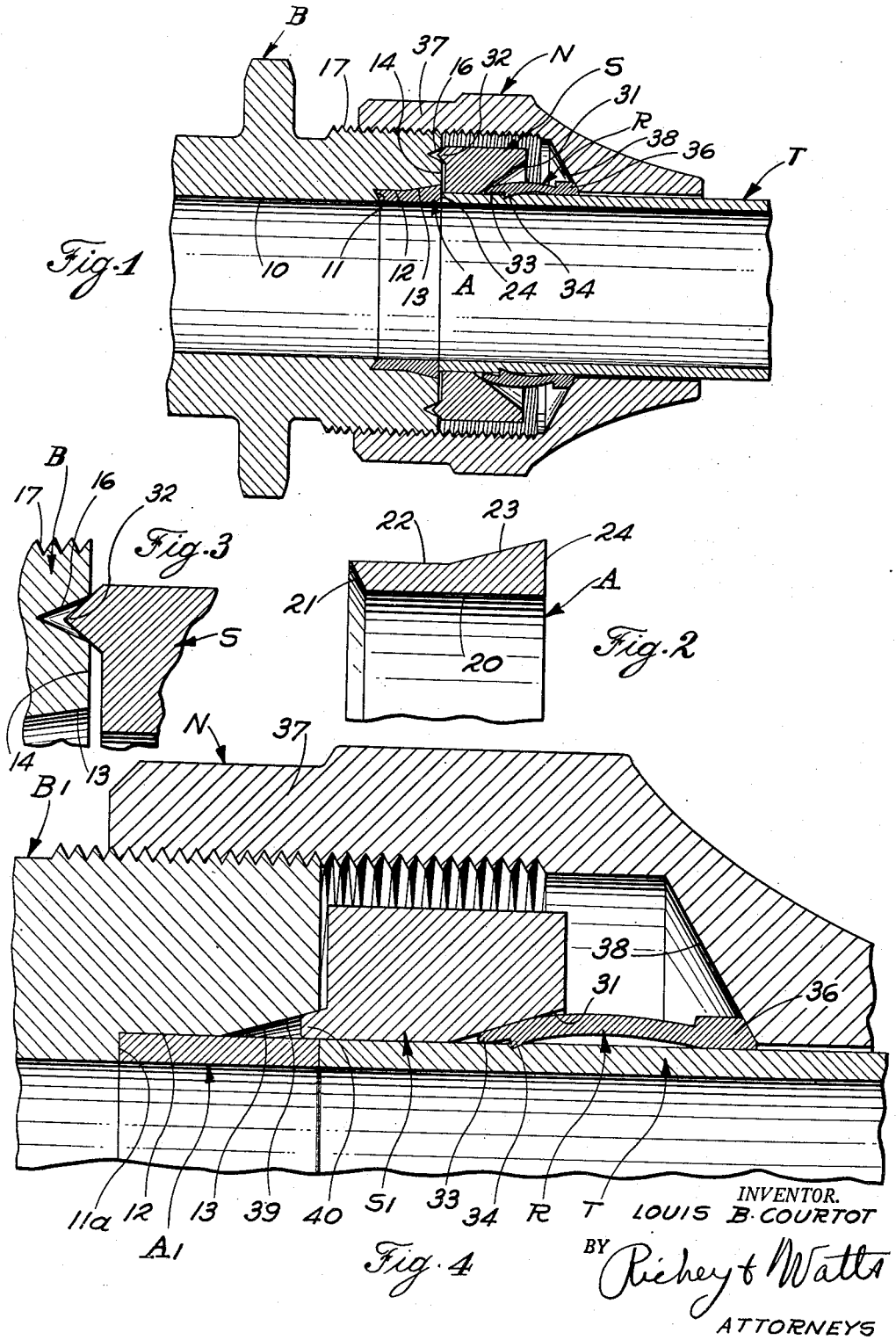

2,687,315

UNITED STATES PATENT OFFICE 2,687,315

SHORT COUPLING CONVERTER

Louis B. Courtot, Cleveland, Ohio, assignor to The Weatherhead Company, Cleveland, Ohio, a corporation of Ohio Application November 23, 1949, Serial No. 129,150

4 Claims. (Cl. 285—122)

This invention relates to pipe couplings, and more specifically to couplings herein referred to as "short couplings," that is, couplings wherein the tubes and coupling elements may be positioned and aligned for tightening of the coupling by sliding the tubes together laterally without requiring appreciable relative axial motion. The principal object of the present invention resides in the provision of what is called a short coupling, that is, a coupling wherein little axial motion of the tube is required to free it from the fitting body and which, at the same time, provides a fluid-tight seal and holds the tubing against axial displacement from the coupling without threading or flaring the tube. Other objects are to effect a fluid-tight seal between a generally radially extending end face of a connector and a sealing ring surrounding a tube to be coupled, and to reinforce the end of such a sleeve against radial expansion.

It is also an object of the present invention to permit the utilization in a short coupling of a body member such as that shown in the patent to Kreidel, 2,211,856, which has a chamber at one end for reception of the tube end and has a tapered throat for contracting a tube cutting ring. Briefly, this is accomplished by providing an adaptor for use in conjunction with the fitting body which is disposed within the chamber normally intended to receive the end of the tube and the cutting ring. The adaptor terminates in an edge which is in general radial alignment with the balance of the end of the fitting body and acts as a tube abutment, thereby permitting lateral assembly of the parts.

It is a feature of a modified form of the invention that there may be a space between the adaptor and the chamber wall of the body which may be utilized to make a seal with a deformable lip formed on the special sealing ring surrounding the tube and urged toward the body by the action of the coupling nut.

The manner in which these objects and advantages may be accomplished will be apparent from the following detailed description of a preferred embodiment of the invention.

In the drawings:

Fig. 1 is a section through an assembled coupling made in accordance with the invention;

Fig. 2 is an enlarged detail showing the shape of the adaptor; and,

Fig. 3 is an enlarged detail showing the sealing lip and groove before tightening the fitting;

Fig. 4 is a modified form of coupling made in accordance with the invention.

Referring to Figs. 1 and 2, the coupling may comprise body B, nut N, cutting ring R, a sealing sleeve S, and the adaptor A. In Fig. 1 a tube T is shown coupled to the body. The body B has a fluid conducting bore 10 leading to an enlarged chamber. The chamber includes an end wall 11 normally intended to receive the end of a tube, a cylindrical bore 12 to center and guide the tube, and a tapered throat 13 provided to radially compress a cutting ring such as ring R against the tube, to cause the ring to cut into and shear up metal of the tube. The end face 14 of the body is preferably generally radially disposed so that the tube T may slide laterally across the end face when assembling the coupling parts. In the preferred construction, a relatively shallow groove 16, having tapered edge walls, is formed in the end face 14 for sealing cooperation with the sleeve S. The body is threaded as at 17 for cooperation with the threads on the nut N.

In accordance with the invention, the enlarged body chamber is filled by the adaptor A which (as seen in Fig. 2) has an edge 21 complementary to the shoulder 11, a cylindrical portion 22 complementary to the cylindrical wall 12 of the body chamber, and a tapered portion 23 complementary to the tapered throat 13 of the body chamber. The adaptor has an edge portion 24 which (as seen in Fig. 1) is in general alignment with the radial surface 14 of the end of the body.

The sealing sleeve S is an annular member surrounding the tube and formed with a tapered throat 31 which has the function of the tapered throat 13 formed in the fitting body, namely, that of compressing the cutting ring R against the tube. Member S has a sealing lip 32 having a greater included angle than that of groove 16 and which may be urged into sealing engagement with the edge portion of the walls of body groove 16.

The cutting ring R may be of any suitable construction to produce the action described in the aforesaid Kreidel patent and the ring shown is one known in the art. The ring includes a nose portion 33 for engagement with the throat 31, a cutting edge 34, and a rearward beveled portion 36 for engagement by a tapered surface 38 formed on the nut N.

To assemble the fitting, the nut N, cutting ring R, and the sealing sleeve S are slipped over the tube in the relative positions shown and the adaptor A is slipped within the chamber in the body B. No special deformation or other preparation of the tube is required, and when the nut and other parts on the tube are drawn back the tube may be slipped laterally into position and into engagement with the end face 24 of the adaptor A. The parts are now slid forward into position and the nut is threaded onto the body. As the nut is tightened, the rings are forced ahead until they are in pressure engagement and with lip 32 on sleeve S in sealing engagement with zones of groove 16. Further tightening of the nut further urges lip 32 into the groove, and since both the lip and body may be formed of relatively deformable metal such as 1010 steel, they are slightly deformed under axial pressure until they are in intimate engagement. As this occurs the cutting ring R is advanced along the tube and compressed by the throat 31 in sleeve S so that the cutting edge cuts into and shears up the tube material, forming an effective seal with the tube and with sleeve S.

Any fluid which tends to leak between the tube and the body is effectively blocked by the intimate pressure engagement of lip 32 against the walls of groove 16, and any fluid which tends to leak between the sleeve S and the tube is blocked by the pressure engagement between the cutting ring R, the tube, and the sleeve S. Thus, it can be seen that a mechanically strong, vibration-proof joint is effected and that fluid is effectively sealed by the coupling, yet the parts may be assembled by bringing them together laterally without need for appreciable lateral motion.

If it is desired to disconnect the coupling, it is only necessary to loosen the nut and spread the tube and the body B, by the relatively small distance represented by the depth of groove 16 whereupon the parts can be separated laterally. Disconnection and reconnection of the coupling can be effected without disturbing the seating of the ring R with the tube end whenever Kreidel-type cutting rings are employed. Thus, wherever the tube and fitting body cannot be axially separated enough to permit the end of the tube to enter the tube-receiving throat of the Kreidel-type body, it is only necessary to slip an adaptor such as one made in accordance with the invention into the body chamber, thereby making it possible to use the body in a short coupling combination.

In Fig. 4 a modified structure is shown. Here the tube-receiving chamber in body B₁ has the aforesaid cylindrical and tapered portions 12 and 13, respectively, but the shoulder may be radial as at 11a instead of tapered as previously shown. However, the major difference resides in the shape of the adaptor which is preferably a cylindrical sleeve-like element diverging from the throat 13 in the body, thereby producing a space 39 between the body and the adaptor A₁. With this construction sealing ring S₁ is provided with a deformable tapered lip 40 which preferably has wall portions complementary to the tapered wall 13 of the body and the peripheral edge of the adaptor. The other parts in this form are like those described so that when the nut N is tightened, lip 40 is wedged into the space provided and if the fit is not perfect the lip is deformed to seal with the body and the adaptor.

The action of cutting ring R is like that just described in that it cuts into and shears up the tube as the nut is tightened, and at same time lip 40 is forced or deformed into intimate engagement with the body or adaptor walls. This form has the additional advantage that the fitting body may be the standard Kreidel construction and requires no additional machining operations such as required to form the groove 16 shown in the previously described form.

Having completed a detailed description of my invention so that others skilled in the art may practice the same, it will be apparent that other forms thereof may be provided without departing from the essence of the invention as defined in the appended claims.

What is claimed is:

1. In a coupling, a body member having a fluid conducting bore, one extreme end of said body member forming a generally radial surface extending inwardly from the periphery of the body member, a tube-end abutment surface adjacent said body bore and substantially in radial alignment with said generally radial end surface, said body being formed with an annular recess in said one end, sleeve means axially movable relative to a tube including a cutting edge for gripping said tube and holding the end thereof against said tube abutting surface and a forward end portion formed with a projecting lip for engaging and sealing with the walls of said recess, the minimum diameter of said sleeve means being at least as great as the diameter of said cutting edge, a clamp member adjustably connected to said body member for engaging the other end portion of said sleeve means to move said projecting lip axially relative to the tube against the body member into engagement therewith, the engagement of said body and projecting lip deforming said lip to provide a surface seal therebetween, said sleeve means including means to deform said cutting edge radially into cutting engagement with a tube in response to axial motion of said clamp means thereby gripping the tube and urging it axially toward said tube abutting surface.

2. In a coupling, a body member having a fluid conducting bore, one extreme end of said body member forming a generally radial surface extending inwardly from the periphery of the body member, a tube-end abutment surface adjacent said body bore and substantially in radial alignment with said generally radial end surface, said body being formed with an annular recess in said one end, a tube with the end thereof in engagement with said tube abutment surface, sleeve means axially movable relative to said tube including a cutting edge for gripping said tube and holding the end thereof against said tube abutting surface and a forward end portion formed with a projecting lip for engaging and sealing with the walls of said recess, a clamp member adjustably connected to said body member for engaging the other end portion of said sleeve means to move said projecting lip axially relative to the tube against the body member into engagement therewith, the engagement of said body and projecting lip deforming said lip to provide a surface seal therebetween, said sleeve means including means to deform said cutting edge radially into cutting engagement with said tube in response to axial motion of said clamp means thereby gripping said tube and urging it axially toward said tube abutting surface.

3. In a coupling, a body member having a fluid conducting bore, one extreme end of said body member forming a generally radial surface extending inwardly from the periphery of the body member, a tube-end abutment surface adjacent said body bore and substantially in radial alignment with said generally radial end surface, said body member being formed with an annular recess in said one end, a tube with the end thereof in engagement with said tube abutment surface, sleeve means axially movable relative to said tube including a tube cutting ring having a cutting edge for gripping said tube and holding the end thereof against said tube abutting surface, and a forward camming member formed with a projecting lip for engaging and sealing with the walls of said recess, a clamp member adjustably connected to said body member for engaging the end of said cutting ring and moving it axially toward said body member into engagement with said camming member, the axial motion of said cutting ring moving said camming member axially relative to said tube into engagement with said recess, the engagement of said recess and projecting lip deforming said lip to provide a surface seal therebetween, said camming member providing means deforming said cutting edge radially into cutting engagement with said tube in response to axial motion of said cutting ring relative to said camming member thereby gripping and urging said tube toward said tube abutting surface.

4. In a coupling a body member having fluid conducting bore merging at one end with an enlarged chamber having an inner cylindrical portion and an internally tapered throat, the end of said body member having a generally radial surface extending from said throat to the periphery of the body member, an adapter member having fluid connecting bore and a cylindrical portion, said cylindrical portion being complementary to and disposed in the cylindrical portion of the body chamber, the outer end of said adapter member being formed to provide a tube-end abutment surface substantially in axial alignment with said generally radial end surface, a tube with the end thereof in engagement with said tube abutment surface, said body member being formed with an annular recess in said one end, sleeve means axial movable relative to said tube including a cutting edge for gripping said tube and holding the end thereof against said tube abutting surface and a forward end portion formed with a projecting lip for engaging and sealing with the walls of said recess, the minimum diameter of said sleeve means being at least as great as the diameter of said cutting edge, a clamp member adjustably connected to said body member for engaging the other end portion of said sleeve means to move said projecting lip axially relative to the tube against the body member into sealing engagement therewith, said sleeve means including means to deform said cutting edge radially into cutting engagement with a tube in response to axial motion of said clamp means thereby gripping the tube and urging it axially toward said tube abutting surface.

References Cited in the file of this patent

UNITED STATES PATENTS

| Number | Name | Date |
|---|---|---|
| 1,884,551 | Boynton | Oct. 25, 1932 |
| 2,139,413 | Kreidel | Dec. 6, 1938 |
| 2,211,856 | Kreidel | Aug. 20, 1940 |
| 2,394,351 | Wurzburger | Feb. 5, 1946 |
| 2,398,618 | Chaveyda | Apr. 16, 1946 |
| 2,457,633 | Borg | Dec. 28, 1948 |
| 2,466,526 | Wolfram | Apr. 5, 1949 |
| 2,511,134 | Stranberg | June 13, 1950 |
| 2,522,785 | Hanson | Sept. 19, 1950 |
| 2,523,135 | Mercier | Sept. 19, 1950 |

FOREIGN PATENTS

| Number | Country | Date |
|---|---|---|
| 571,935 | Great Britain | Sept. 14, 1945 |
| 691,001 | Germany | May 14, 1940 |
| 478,796 | Great Britain | June 24, 1938 |